US005705493A

United States Patent [19]

Ferrari

[11] Patent Number: 5,705,493
[45] Date of Patent: Jan. 6, 1998

[54] OLIGOSACCHARIDES HAVING BIOLOGICAL ACTIVITY AND PREPARATION OF SAME FROM SUPERSULFATED DERMATAN

[75] Inventor: Gianni Ferrari, Milan, Italy

[73] Assignee: Mediolanum Farmaceutici S.p.A., Milan, Italy

[21] Appl. No.: 481,282

[22] PCT Filed: Dec. 21, 1993

[86] PCT No.: PCT/EP93/03646

§ 371 Date: Jun. 6, 1995

§ 102(e) Date: Jun. 6, 1995

[87] PCT Pub. No.: WO94/14850

PCT Pub. Date: Jul. 7, 1994

[30] Foreign Application Priority Data

Dec. 23, 1992 [IT] Italy ................... MI92A2950

[51] Int. Cl.$^6$ ................... A61K 31/725; C08B 37/00
[52] U.S. Cl. ................... 514/54; 536/53; 536/54; 536/55; 536/55.1; 536/55.2; 536/55.3; 536/124; 514/62
[58] Field of Search ................... 536/53, 54, 55, 536/55.1, 55.2, 55.3, 124; 514/54, 62

[56] References Cited

U.S. PATENT DOCUMENTS

| 3,454,560 | 7/1969 | Nagasawa | 536/53 |
|---|---|---|---|
| 4,524,066 | 6/1985 | Wolf | 514/23 |
| 4,783,447 | 11/1988 | Del Bono et al. | 514/56 |
| 5,252,339 | 10/1993 | Cristofori et al. | 424/479 |

FOREIGN PATENT DOCUMENTS

| 0040144 | 11/1981 | European Pat. Off. . |
|---|---|---|
| 0040144 | 1/1982 | European Pat. Off. . |
| 0269937 | 6/1988 | European Pat. Off. . |
| 2548672 | 1/1985 | France . |

OTHER PUBLICATIONS

Ofosu et al. *Biochem J.* 1987, 248, 889–896 Months Not Available.
Tollefsen et al. *J. Biol. Chem.* 1986, 261(19), 8854–8858 Months Not Available.
Scully et al. *Biochem J.* 1988, 254, 547–551 Months Not Available.
Nikitin "The Chemistry of Cellulose and Wood", Israel Program for Scientific Translations Ltd., Jerusalem 1966, Chapter IV Months Not Available.
Chemical Abstracts, vol. 82, p. 646, 156647, (Apr. 1974), Doi et al., "Ester Derivatives of Chordroitin Sulfate or Polysulfate or their Salts".
Thrombosis Research, vol. 52, No. 1, pp. 153–164 (1988) Dole et al. "Effects of Increased Sulfation of Dermatan Sulfate on its In Vitro and In Viro Pharmacological Properties".

*Primary Examiner*—Kathleen K. Fonda
*Attorney, Agent, or Firm*—Abelman, Frayne & Schwab

[57] ABSTRACT

Oligosaccharides derived from natural or supersulphated GAGS or their mixtures, with a heparin content less than 1% by wt. having average molecular weight between 2,500 and 15,000 dalton, at least 50% by wt. of said oligosaccharide having a molecular weight in the +20% range in respect of the average molecular weight, providing an exceptional bioavailability and an antithrombin activity equal or higher than the starting GAGS.

11 Claims, No Drawings

OLIGOSACCHARIDES HAVING BIOLOGICAL ACTIVITY AND PREPARATION OF SAME FROM SUPERSULFATED DERMATAN

This is the U.S. national stage entry under 35 U.S.C. 371 of PCT/EP93/03646, filed Dec 21, 1993.

TECHNICAL FIELD

The present invention relates to some oligosaccharides having biological activity and a procedure For the preparation of same from glycossminoglycans (GAGS).

As known, the biological activity of GAGS makes them pharmaceutically useful for the treatment of arterial and venous thrombotic states, atherosclerosis, lipoidoproteinosis, ischaemic states in general, hypofibrinolysis and more generally of disorders related to coagulation and haemostasis.

GAGS therapeutic use is, therefore, very interesting: consequently, extensive research has been carried out to define their structure. However, a complete structure determination has not been made so far since the extracts contain different substances of very similar structures, whose presence depends on the methods of extraction used and on the animal tissues wherefrom extractions were made. These actual difficulties, typical of the field under examination, have so far hindered a complete synthesis of the test products as well as a fairly approximate Forecast of what would happen should different GAGS be subjected to the same chemical treatment.

PRIOR ART

Since GAGS are increasingly being used in the medical practice, improved procedures of extraction and purification of extracts from various animal organs have been developed on an industrial scale. Since GAGS extracts have a high molecular weight, attempts have been made to breakdown the molecular structure of GAGS to obtain lower-molecular-weight fractions, such as for example dermatan sulphate or heparan sulphate.

The applicant has been studying this matter several years and owns several patents disclosing and claiming the results obtained (cf. U.S. Pat. No. 4,783,447, No. 4,870,166, No. 4,987,222, and No. 5,116,963).

Various treatments of GAGS are disclosed in said patents, from the treatment based on enzymes to that based on oxidizing agents, including the preparation of oligosaccharide fractions of dermatan sulphate using gamma radiation from cobalt 60.

The problem of the bioavailability of commercial GAGS has not been optimally settled yet: it follows that the Applicant as well as other companies are still working to find new oligosaccharides derived from the oligosaccharides already known, which would show the same biological activity as the starting products and, at the same time, provide a higher bioavailability.

Procedures to decrease the molecular weight of heparin (the best known glycosaminoglycan, used in anticoagulant-antithrombotic therapy) by esterification followed by depolymerization and subsequent hydrolysis of the esters in an aqueous medium are illustrated in European patent applications EP-A-40144 and EP-A-44228, and in French patent application 2548672. The aqueous medium and the high temperatures utilized bring about products showing remarkable activity losses in respect of starting heparin.

Said procedures, though allowing the production of a series of oligosaccharides of lower molecular weight in respect of starting heparin, have the great disadvantage of causing an excessive reduction in their biological activity, a useful characteristic for their therapeutic use.

In addition, such procedures, as applied by the Applicant, could not depolymerize dermatan sulphate and chondroitin sulphate, in contrast by heparin.

TECHNICAL PROBLEM

The present invention provides a solution of the technical problem, consisting in the development of a new procedure for the treatment of known GAGS or of mixtures thereof, either natural or previously supersulphated, allowing the obtainment of new oligosaccharides that, in respect of the starting products, show a noticeably lower molecular weight, a higher bioavailability and, at the same time, the same or an improved biological activity.

DETAILED DESCRIPTION OF THE INVENTION

The main characteristic of the oligosaccharides under this invention is a biological activity that is equal to or higher than that of the starting GAGS (or GAGS mixtures). The relevant preparation procedure is a further object of the present invention. Preferred GAGS used as starting materials to obtain the oligosaccharides of this invention are chondroitin sulphate and dermatan sulphate, either natural or supersulphated, i.e. previously treated to increase their sulphuric groups content.

The expression "supersulphated glycosaminoglycans" is used herein to mean natural glycosaminoglycans that have been treated according to a known procedure, e.g. with trimethylamine sulphur trioxide in formamide solution, to increase the sulphate groups content in the starting GAGS molecule from 15% to 100% by weight.

The procedure according to the present invention may be used also with polysaccharide mixtures of natural origin derived from various GAGS, which may also be supersulphated.

The claimed oligosaccharides exhibit the following main characteristics:

average molecular weight between 2,500 and 15,000 dalton, with a molecular weight distribution being such that at least 50% by wt. of the compound has a molecular weight in the ±20% range in respect of the average molecular weight;

specific UV absorption at 230 nm E (1% sol. in 1 cm cell) between 6 and 30;

specific rotation power at 20° C. $[\alpha]_D$ between −70° to 30°;

uronic acids content between 23% to 35% by wt.;

sulphate groups content (expressed as organic sulphur) between 6% to 12%;

anti-Xa factor activity between 5 and 50 UaXa/mg;

antithrombin activity equal to or higher than that of starting GAGS.

In the preferred embodiments of the invention, the molecular weight distribution is such that more than 80% by wt. of the compound has a molecular weight in the ±20% range in respect of the average molecular weight.

The oligosaccharides obtained from supersulphated GAGS show a noticeably higher activity in vitro than non-sulphated starting products; instead their activity is of the same order of magnitude as that of natural GAGS.

In any case, the oligosaccharides under the present invention show a higher biological activity in vivo and a higher bioavailability than the starting GAGS.

The average molecular weight of the oligosaccharides obtained from dermatan sulphate or chondroitin sulphate typically ranges between 4,000 and 12,000 dalton, while that of GAGS mixtures typically ranges between 3,000 and 10,000 dalton.

A particularly preferred oligosaccharides mixture is obtained from a product extracted from aorta, myocardium and other vascularized organs of mammals, as illustrated in U.S. Pat. No. 4,783,447. According to a basic characteristic of the present invention, the procedure for the preparation of the aforesaid oligosaccharides utilizes β-elimination reactions mainly in organic solvents or, in case of supersulphated GAGS, also in aqueous solvents, through a direct process yielding a depolymerized product or through isolation of esterified intermediates.

The process under the invention yields oligosaccharides exhibiting low molecular weight distribution (i.e. low polydispersion) and excellent reproducibility as concerns both molecular weight and biological activity.

The procedure according to the present invention may be successfully applied to natural products, to supersulphated products having a different sulphur % content, and to mixtures containing various % amounts of GAGS (heparin, heparan sulphate, dermatan sulphate and chondroitin sulphate).

The GAGS that were studied and used for this process (dermatan, chondroitin, and GAGS mixtures) were isolated from organs excised from various mammals, e.g. from swine, bovine, ovine intestinal mucosa, bovine and swine skin, bovine trachea, and bovine aorta. The procedure of this invention consists in the following steps:

a) natural or supersulphated GAGS or GAGS mixtures are salified in an aqueous solvent with quaternary ammonium bases, at a temperature of 10° C. to 40° C.;

b) the resulting salts are esterified in an organic solvent at a temperature of 20° C. to 55° C. and with reaction times between 1 to 48 hrs to give an esterified carboxylic groups content of 5% to 70% by wt., preferably of 10% to 50% by wt., in respect of the groups originally present in the compound;

c) the resulting esters are directly depolymerized in the same organic solution in the presence of a base, at a temperature of 0° C. to 35° C., preferably of 0° C. to 30° C., for a period of 1 to 48 hrs, with liberation of the oligosaccharides formed. These are collected and purified by alcoholic fractional precipitations, decolourizing treatment with peroxides, ultrafiltration and reverse osmosis.

According to an alternative embodiment of the procedure of this invention, the esterified product obtained in b) can be purified before treating it, in a solvent, with the bases of c).

Preferred quaternary ammonium bases For step a) are benzethonium chloride, cetylpyridinium chloride, quaternary ammonium bases whose molecule contains at least 15 carbon atoms.

The esterifying agents normally used in organic syntheses are suitable for step b) of the procedure under the invention. Among them, the preferred are alkyl and alkylaryl halides and, in particular, methyl, ethyl and benzyl chloride bromides and iodides. Particularly preferred bases for step c) of the procedure under the invention are sodium hydroxide, potassium hydroxide, sodium or potassium alcoholates or methylates, alkaline metals carbonates, quaternary ammonium hydroxides, such as benzyltrimethylammonium hydroxide (Triton B).

Steps b) and c) of the procedure under the invention are typically carried out in organic solvents, in particular dimethylformamide, formamide, methylene chloride, dimethyl sulphoxide or, in case of supersulphated products, also in aqueous solvents.

In the examples conveyed hereinafter to illustrate the claimed invention, the starting products used had the following main characteristics:

1. Dermatan sulphate isolated from bovine, swine and ovine intestinal mucosa, and from bovine and swine skin:

Heparin content <1%

Organic sulphur content 5.5% to 7.5%

Specific rotation power −45° to −75°

Uronic acids content 25% to 37%

Average molecular weight 16,000 to 40,000 dalton

Antithrombin activity (via Heparin Cofactor II) $IC_{50}$ 0.3 to 0.8 µg/ml

2. Supersutphated dermatan:

Heparin content <1%

Organic sulphur content 7.5% to 12%

Specific rotation power −25° to −65°

Uronic acids content 23% to 37%

Average molecular weight 16,000 to 40,000 dalton

Antithrombin activity (via Heparin Cofactor II) $IC_{50}$ 0.01 to 0.5 µg/ml

3. Chondroitin sulphate isolated from bovine and swine intestinal mucosa and from bovine trachea:

Dermatan sulphate content <1%

Organic sulphur content 5% to 7%

Specific rotation power −20° to −35°

Uronic acids content 24% to 33%

Average molecular weight 16,000 to 40,000 dalton

Antithrombin activity (via Heparin Cofactor II) $IC_{50}$ 70 to 120 µg/ml

4. Supersulphated chondroitin:

Dermatan content <1%

Organic sulphur content 7% to 12%

Specific rotation power −10° to −30°

Uronic acids content 23% to 33%

Average molecular weight 16,000 to 40,000 dalton

Antithrombin activity (via Heparin Cofactor II) $IC_{50}$ 0.1 to 30 µg/ml

EXAMPLE 1

Dermatan benzethonium salt (100 g) obtained from dermatan isolated from swine intestinal mucosa and having an average molecular weight of 23,500 dalton was dissolved in dimethylformamine (500 ml), added with benzyl chloride (25 ml), allowed to stand at 25°±1° C. for a period of 3 hrs, whereupon benzyltrimethylammonium hydroxide (20 ml) (40% in methanol) (Triton 8) was added. The solution was allowed to stand at 25°±1° C. for a period of 2 hrs and slowly poured in methanol (1100 ml) containing 10% sodium acetate. The precipitate that formed was separated by filtration, washed with methanol and ethanol, and dried under vacuum at 35° C. to 40° C.

65 g of raw low-molecular-weight dermatan was obtained.

The product obtained was treated with 0.2N sodium hydroxide (1300 ml) at 25° C.±1° C. for a period of 2 hrs.

The solution was neutralized by addition of 1N hydrochloric acid solution, added with hydrogen peroxide at 110 vol. (6.5 ml), allowed to stand at for a period of 4 hrs, heated to room temperature, added with 105 w/v sodium chloride, and precipitated with methanol (3 1). The precipitate that formed was separated, washed with methanol and then with ethanol, and dried under vacuum at 40° C. to 45° C.

25 g of purified low-molecular-weight dermatan having the following characteristics was obtained:

Uronic acids content 27.5%

Specific rotation –60.5°

UV absorption (E at 230 nm) 8.4

Antithrombin activity (via HC II) $IC_{50}$ 0.54 µg/ml

EXAMPLE 2

Dermatan benzethonium salt (100 g) obtained from dermatan isolated from bovine intestinal mucosa, having the characteristics described above and an average molecular weight of 24,500 dalton, was depolymerized as per Example 1 except that benzyl chloride (30 ml) was used and the reaction time was reduced from 3 hrs to 1 hr.

66 g of raw low-molecular-weight dermatan was obtained and purified as per Example 1 to give 31 g of purified low-molecular-weight dermatan having the following characteristics:

Average molecular weight 9800 dalton

Uronic acids content 27.8%

Organic sulphur content 6.8%

Specific rotation –62.5°

UV absorption (E at 230 nm) 6.65

Antithrombin activity (via HC II) $IC_{50}$ 0.73 µg/ml

EXAMPLE 3

Dermatan benzethonium salt (100 g) obtained from dermatan isolated from swine skin, having the characteristics described above and an average molecular weight of 26,700 dalton, was depolymerized as per Example 1 except that benzyl chloride (20 ml) was used, the esterification time was reduced from 3 hrs to 1.5 hr, and the temperature was 35° C.±1°C.

70 g of raw low-molecular-weight dermatan was obtained and purified as per Example 1 to give 33 g of purified low-molecular-weight dermatan having the following characteristics:

Average molecular weight 13600 dalton

Uronic acids content 31.2%

Organic sulphur content 6.8%

Specific rotation –63.2°

UV absorption (E at 230 nm) 3.72

Antithrombin activity (via HC II) $IC_{50}$ 0.49 µg/ml

EXAMPLE 4

Dermatan benzethonium salt (50 g) obtained from dermatan isolated from bovine intestinal mucosa, having the characteristics described above, was depolymerized as per Example 1 except that methyl iodide (12.5 ml) instead of benzyl chloride was used. 23 g of raw low-molecular-weight dermatan was obtained and purified as per Example 1 to give 16 g of purified low-molecular-weight dermatan having the following characteristics:

Average molecular weight 14300 dalton

Uronic acids content 30.8%

Organic sulphur content 6.5%

Specific rotation –56.8°

UV absorption (E at 230 nm) 2.05

Antithrombin activity (via HC II) $IC_{50}$ 0.3 µg/ml

EXAMPLE 5

Dermatan benzethonium salt (50 g) obtained from dermatan isolated from swine intestinal mucosa, having the characteristics described above, was dissolved in dimethylformamine (250 ml), added with benzyl chloride (12.5 ml), and allowed to stand at 25°±1° C. for a period of 3 hrs. The resulting solution was precipitated by addition of methanol (500 ml) containing 10% sodium acetate. The precipitate was isolated by washing with methanol and then with ethanol.

25 g of dermatan benzyl ester was obtained.

The benzethonium salt of the ester obtained was prepared, successively dissolved in dimethylformamide (250 ml), added with Triton B and allowed to stand at 25°±1° C. for a period of 2 hrs. The resulting solution was poured in methanol (2 1) containing 10% sodium acetate. The precipitate that formed was isolated, washed with methanol and then with ethanol, and dried in an oven at 35° C to 40° C.

15 g of raw low-molecular-weight dermatan was obtained.

The raw product was treated with 5% sodium carbonate (300 ml) and allowed to stand at 25° C.±1° C. for a period of 4 hrs. The solution was neutralized with 1N hydrochloric acid, added with hydrogen peroxide at 110 vol. (1.5 ml), allowed to stand at 4° C. for period of 4 hrs, heated to room temperature, added with 10% w/v sodium chloride, and precipitated with methanol. The precipitate that formed was isolated, washed with methanol and then with ethanol, and dried in an oven at 35° C. to 40° C.

10 g of purified low-molecular-weight dermatan having the following characteristics was obtained:

Average molecular weight 8500 dalton

Uronic acids content 31.8%

Organic sulphur content 6.9%

Specific rotation –54.5°

UV absorption (E at 230 nm) 9.0

Antithrombin activity (via HC II) IC50 0.45 µg/ml

EXAMPLE 6

Dermatan benzethonium salt (50 g) obtained from dermatan isolated from swine intestinal mucosa, having the characteristics described above, was depolymerized as per Example 5 except that the dermatan ester benzethonium salt was dissolved in methylene chloride instead of dimethylformamide.

16 g of raw low-molecular-weight dermatan was obtained and purified as per Example 5 to give 13 g of purified low-molecular-weight dermatan having the following characteristics:

Average molecular weight 11300 dalton

Uronic acids content 32.1%

Organic sulphur content 6.85

Specific rotation –58.8°

UV absorption (E at 230 nm) 3.45

Antithrombin activity (via HC II) $IC_{50}$ 0.35 µg/ml

EXAMPLE 7

Dermatan (50 g) isolated from swine intestinal mucosa, having the characteristics described above, was dissolved in formamide at 60° C. (666 ml) and then in trimethylamine sulphur trioxide (116 g). The solution was allowed to react at 60° C.±1° C. for a period of 3 hrs whereupon the solution was rapidly cooled and precipitated with methanol (2 l) containing 10% sodium acetate. The precipitate was isolated, washed with methanol and then with ethanol (or acetone). The precipitate was dried and dissolved in water. The solution was passed through an ultrafilter, concentrated by reverse osmosis, added with 5% sodium chloride, and precipitated with 2 vol. methanol. The precipitate was isolated, washed with methanol and then with ethanol, and dried in an oven at 35° C. to 45° C. 49 g of supersulphated dermatan having the following characteristics was obtained:

Sulphur content 12.4%

Uronic acids content 28.0%

The product obtained (50 g) was dissolved in dimethylformamide (250 ml), added with benzyl chloride (12.5 ml), and allowed to stand at 25° C.±1° C. for a period of 3 hrs, whereupon benzyltrimethylammonium hydroxide (10 ml) (40% in methanol) was added and allowed to stand at 25° C.±1° C. for a period of 2 hrs. The solution was poured in methanol (600 ml) containing 10% sodium acetate. The precipitate that formed was separated by filtration, washed with methanol and then with ethanol, and dried under vacuum at 35° C. to 40° C.

37 g of raw low-molecular-weight supersulphated dermatan was obtained.

The raw product was treated with 0.5N sodium hydroxide (650 ml) at 4° C.±1° C. for a period of 2 hrs. The solution was neutralized by addition of 1N HCl solution, added with hydrogen peroxide at 110 vol. (3 ml), allowed to stand at 4° C. for a period of 4 hrs, heated to room temperature, added with 10% w/v sodium chloride, and precipitated with methanol (1500 ml). The precipitate that formed was isolated, washed with methanol and then with ethanol, and dried under vacuum at 40° C. to 45° C.

12.5 g of purified low-molecular-weight supersulphated dermatan having the following characteristics was obtained:

Average molecular weight 10900 dalton

Uronic acids content 28.1%

Organic sulphur content 11.9%

Specific rotation −35.7°

UV absorption (E at 230 nm) 2.55

Antithrombin activity (via HC II) $IC_{50}$ 0.018 µg/ml

EXAMPLE 8

Dermatan sulphate (50 g) isolated from bovine intestinal mucosa, having the characteristics described above, was sulphated as per Example 7 except that the amount of trimethylamine sulphur trioxide was 75 g and the reaction time was 5 hrs. 49.6 g of supersulphated dermatan having the following characteristics was obtained:

Sulphur content 10.7%

Uronic acids content 28.4%

The product obtained (50 g) was depolymerized as per Example 7, except that methyl iodide (12.5 ml) was used instead of benzyl chloride.

14 g of purified low-molecular-weight supersulphated dermatan having the following characteristics was obtained:

Average molecular weight 12700 dalton

Uronic acids content 28.9%

Organic sulphur content 10.2%

Specific rotation −36.6°

UV absorption (E at 230 nm) 2.8

Antithrombin activity (via HC II) $IC_{50}$ 0.024 µg/ml

EXAMPLE 9

Dermatan sulphate (50 g) isolated from swine skin, having the characteristics described above, was sulphated as per Example 7 except that the amount of trimethylamine sulphur trioxide was 33 g and the reaction time was reduced to 1 hr. 49 g of supersulphated dermatan having the following characteristics was obtained:

Sulphur content 8.2%

Uronic acids content 33.2%

The product obtained (50 g) was depolymerized as per Example 7 except that methyl iodide (12.5 ml) was used instead of benzyl chloride.

16.5 g of purified low-molecular-weight supersulphated dermatan having the following characteristics was obtained:

Average molecular weight 14500 dalton

Uronic acids content 30.45%

Organic sulphur content 8.0%

Specific rotation −48.6°

UV absorption (E at 230 nm) 2.65

Antithrombin activity (via HC II) $IC_{50}$ 0.24 µg/ml

EXAMPLE 10

Supersulphated dermatan benzethonium salt (50 g) obtained from dermatan isolated from swine intestinal mucosa, having the characteristics described above and sulphated as per Example 7, with a sulphur content of 10.7%, was dissolved in dimethylformamide (250 ml), added with benzyl chloride (12.5 ml), allowed to stand at 35° C. ±1° C. for a period of 1.5 hr, whereupon the solution was B precipitated with methanol (500 l) containing 10% sodium acetate.

The precipitate was isolated, washed with methanol and dried in an oven at 35° C. to 45° C.

The precipitate was dissolved in water (300 ml), added with 10% w/v sodium chloride and precipitated with methanol (600 ml). The solution was Filtered and the precipitate collected, washed with methanol and then with ethanol, and dried in an oven at 35° C. to 45°.

18 g of purified benzyl ester having the following characteristics was obtained:

Sulphur content 10.0%

Esterification degree 24.5%

The product obtained (50 g) was dissolved in dimethylformamide (250 ml), added with Triton B (10 ml), allowed to stand at 25°±1° C. for a period of 3 hrs, whereupon the solution was precipitated with methanol (500 ml) containing 10% sodium acetate. The precipitate was isolated, washed with methanol and then with ethanol, and dried in an oven at 35° C. to 40° C.

17.5 g of raw low-molecular-weight supersulphated dermatan was obtained.

The precipitate was dissolved in 0.5N sodium hydroxide (350 ml) and allowed to stand at 4° C. for a period of 2 hrs. The solution was neutralized by addition of 1N hydrochloric acid, added with hydrogen peroxide at 110 vol. (1.5 ml), allowed to stand at 4° C. for a period of 4 hrs, whereupon it was added with 10% w/v sodium chloride, and precipitated with methanol (800 ml). The precipitate was isolated, washed with methanol and then with ethanol, and dried in an oven at 35° C. to 45° C.

13 g of purified low-molecular-weight supersulphated dermatan having the following characteristics was obtained:

Average molecular weight 9970 dalton

Uronic acids content 27.25%

Organic sulphur content 10.2%

Specific Potation −36.6°

UV absorption (E at 230 nm) 5.45

Antithrombin activity (via HC II) $IC_{50}$ n.d.

EXAMPLE 11

Supersulphated dermatan benzethonium salt (50 g) obtained from dermatan isolated from ovine intestinal mucosa, having the characteristics described above and, in particular, sulphated as pep Example 8, with a sulphur content of 8.2%, was treated as pep Example 10.

20.2 g of purified dermatan benzyl ester having the following characteristics was obtained:

Sulphur content 7.6%

Esterification degree 24.6%

Said ester was depolymerized as per Example 10 except that the ester was dissolved to a concentration of 7.5% in methylene chloride instead of dimethylformamide.

15.2 g of saw low-molecular-weight supersulphated dermatan and 12 g of purified product having the following characteristics were obtained:

Average molecular weight 13600 dalton

Uronic acids content 33.55%

Organic sulphur content 8.2%

Specific rotation −31.8°

UV absorption (E at 230 nm) n.d. - Antithrombin activity (via HC II) $IC_{50}$ n.d.

EXAMPLE 12

Supersulphated dermatan benzethonium salt (50 g) obtained from dermatan isolated from swine intestinal mucosa, having the characteristics described above and, in particular, sulphated as per Example 7, with a sulphur content of 10.7%, was treated as pep Example 10 except that methyl iodide (12.5 ml) was used instead of benzyl chloride.

17 g of purified dermatan methyl ester having the following characteristics was obtained:

Sulphur content 10.4%

Esterification degree 72.5%

The operation proceeded as per Example 10, except that the ester was dissolved to a concentration of 7.5% in methylene chloride instead of dimethylformamide.

9 g of raw low-molecular-weight supersulphated dermatan and 6.5 g of purified product having the following characteristics were obtained:

Average molecular weight 7200 dalton

Uronic acids content 27.3%

Organic sulphur content 10.4%

Specific rotation −33.2°

UV absorption (E at 230 nm)

Antithrombin activity (via HC II) $IC_{50}$ 0.19 µg/ml.

EXAMPLE 13

Supersulphated dermatan benzethonium salt (50 g) obtained from dermatan isolated from swine skin, having the characteristics described above and sulphated as per Example 8, with a sulphur content of 8.2%, was treated as per Example 12. A methyl ester having the following characteristics was obtained:

Sulphur content 7.3%

Esterification degree 71.8%

The operation proceeded as per Example 10.

8.5 g of raw low-molecular-weight supersulphated dermatan and 4.5 g of purified product having the following characteristics were obtained:

Average molecular weight 10600 dalton

Uronic acids content 31.2%

Organic sulphur content 7.9%

Specific rotation −48°

UV absorption (E at 230 nm) 3.5

Antithrombin activity (via HC II) $IC_{50}$ 0.64 µg/ml.

EXAMPLE 14

Supersulphated dermatan benzethonium salt (25 g) obtained from dermatan isolated From swine intestinal mucosa, having the characteristics described above and sulphated as per Example 7, with a sulphur content of 10.7%, was dissolved in dimethylformamide (125 ml), added with benzyl chloride (20 ml), and allowed to stand at 25° C.±1° C. for a period of 5 hrs, whereupon the solution was precipitated with methanol (250 ml) containing 10% sodium acetate. The precipitate was isolated, washed with methanol, and dried in an oven at 35° C. to 40° C.

11 g of raw ester was obtained.

The product was dissolved in water (150 ml), added with 10% w/v sodium chloride, and precipitated with methanol (250 ml). The precipitate was isolated, washed with methanol and then with ethanol, and dried in an oven.

8.75 g of purified dermatan benzyl ester having the following characteristics was obtained:

Sulphur content 10.5%

Esterification degree 51.2%

The purified ester was dissolved in 0.1N sodium hydroxide (175 ml), allowed to stand at 60° C.±1° C. for a period of 1 hr, whereupon the solution was rapidly cooled, neutralized by addition of 1N hydrochloric acid, added with hydrogen peroxide at 110 vol. (0.9 ml), and allowed to stand at 4° C. for a period of 4 hrs. The solution was added with 10% w/v sodium chloride and precipitated with methanol (350 ml). The precipitate was washed with methanol, then with ethanol, and dried in an oven.

6.53 g of purified low-molecular-weight supersulphated dermatan having the following characteristics was obtained:

Average molecular weight 12500 dalton

Uronic acids content 30.75%

Organic sulphur content 10.7%

Specific rotation −28.1°

UV absorption (E at 230 nm) 3.0

Antithrombin activity (via HC II) $IC_{50}$ n.d.

EXAMPLE 15

Chondroitin sulphate benzethonium salt (25 g) obtained from chondroitin isolated from swine intestinal mucosa, having an average molecular weight of 19000 dalton, was dissolved in dimethylformamide (125 ml), added with benzyl chloride (6.25 ml), allowed to stand at 25° C.±1° C. for a period of 3 hrs, and added with Triton B (5 ml). The resulting solution was allowed to stand at 25° C.±1° C. for a period of 2 hrs, precipitated with methanol (270 ml) containing 10% sodium acetate. The precipitate that formed was separated by filtration, washed with methanol, and dried in an oven at 35° C. to 40° C.

8.65 g of raw low-molecular-weight chondroitin was obtained.

The raw product was treated with 0.2N sodium hydroxide (175 ml) and allowed to stand at 25° C.±1° C. For a period of 2 hrs. The solution was neutralized by addition of 1N hydrochloric acid, added with hydrogen peroxide at 110 vol. (0.9 ml), allowed to stand at 4° C. for a period of 4 hrs, heated to room temperature, added with 10% w/v sodium chloride, and precipitated with methanol (350 ml). The precipitate that formed was isolated, washed with methanol, then with ethanol, and dried in an oven at 40° C. ±45° C.

4 g of purified low-molecular-weight chondroitin having the following characteristics was obtained:

Average molecular weight 9100 dalton

Uronic acids content 24%

Organic sulphur content 7.2%

Specific rotation −24°

UV absorption (E at 230 nm) 9.55

Antithrombin activity (via HC II) $IC_{50}$ 52.4 μg/ml.

EXAMPLE 16

Chondroitin benzethonium salt (25 g) obtained from chondroitin isolated from bovine intestinal mucosa, having an average molecular weight of 20500 dalton, was depolymerized as per Example 15 except that methyl iodide (5 ml) was used instead of benzyl chloride and esterification was carried out at 35° C.±1° C. for a period of 1.5 hr.

4.2 g of purified low-molecular-weight chondroitin having the following characteristics was obtained:

Average molecular weight 12100 dalton

Uronic acids content 24%

Organic sulphur content 7.2%

Specific rotation −22.4°

UV absorption (E at 230 nm) 6.7

Antithrombin activity (via HC II) $IC_{50}$ 71.8 μg/ml.

EXAMPLE 17

Chondroitin sulphate benzethonium salt (25 g) obtained from chondroitin isolated from swine intestinal mucosa, having the characteristics described above, was depolymerized as per Example 15 except that, after treatment with benzyl chloride, the solution was precipitated with methanol (250 ml) containing 10% sodium acetate. The precipitate was isolated, washed with methanol and then with ethanol, and dried in an oven.

10 g of raw benzyl ester was obtained.

The ester was dissolved in water (100 ml), added with 10% w/v sodium chloride, and precipitated with methanol (200 ml). The precipitate was isolated, washed with methanol and then with ethanol, and dried.

8.75 g of purified ester having the Following characteristics was obtained:

Sulphur content 6.3%

Esterification degree 18%

The purified ester was depolymerized as per Example 15.

2.8 g of purified low-molecular-weight chondroitin having the following characteristics was obtained:

Average molecular weight 7700 dalton

Uronic acids content n.d.

Organic sulphur content 6.5%.

Specific rotation −21.8°

UV absorption (E at 230 nm) 11.2

Antithrombin activity (via HC II) $IC_{50}$ 43.7 μg/ml.

EXAMPLE 18

Chondroitin sulphate (25 g) isolated from bovine intestinal mucosa, having the characteristics described above, was dissolved in formamide (333 ml) at 60° C., added with trimethylamine sulphur trioxide (12.5 g). The solution was allowed to stand at 60° C.±1° C. for a period of 2 hrs, then rapidly cooled, and precipitated with methanol (2 l) containing 10% sodium acetate.

The operation proceeded as per Example 7.

18.5 g of supersulphated chondroitin having the following characteristics was obtained:

Sulphur content 7.6%

Uronic acids content 25.5%

A benzethonium salt of said product was prepared as pep Example 7 except that benzyl chloride (5 ml) was used and the reaction time was 2 hrs.

5 g of purified low-molecular-weight supersulphated chondroitin having the following characteristics was obtained:

Average molecular weight 9800 dalton

Uronic acids content 25.2%

Organic sulphur content 7.3%

Specific rotation −20.4°

UV absorption (E at 230 nm) 7.25

Antithrombin activity (via HC II) $IC_{50}$ 17.5 μg/ml.

EXAMPLE 19

Chondroitin (25 g) obtained from bovine trachea, having a molecular weight of 22000 dalton, was sulphated as per Example 18 except that trimethylamine sulphur trioxide (75 g) was used end the reaction time was 3 hrs.

22 g of supersulphated chondroitin having the following characteristics was obtained:

Sulphur content 11.3%

Uronic acids content 28.9%

A benzethonium salt of said product was prepared and depolymerized as per Example 7.

8.9 g of purified low-molecular-weight supersulphated chondroitin having the following characteristics was obtained:

Average molecular weight 8700 dalton

Uronic acids content 29%

Organic sulphur content 10.9%

Specific rotation −12.2°

UV absorption (E at 230 nm) 6.6

Antithrombin activity (via HC II) $IC_{50}$ 0.09 μg/ml.

EXAMPLE 20

Chondroitin (25 g) obtained from swine intestinal mucosa having the characteristics described above was sulphated as per Example 18 and depolymerized as per Example 18 except that methyl iodide (5 ml) was used instead of benzyl chloride.

3 g of purified low-molecular-weight supersulphated chondroitin having the Following characteristics was obtained:

Average molecular weight 9600 dalton
Uronic acids content n.d.
Organic sulphur content 7%
Specific rotation n.d.
UV absorption (E at 230 nm) n.d.
Antithrombin activity (via HC II) $IC_{50}$ 12.6 µg/ml

EXAMPLE 20

Supersulphated chondroitin benzethonium salt (25 g) obtained From chondroitin isolated From bovine intestinal mucosa, having the characteristics described above and, in particular, sulphated as per Example 18, with a sulphur content of 11.7%, was treated as per Example 10 except that benzyl chloride (5 ml) was used and the reaction time was 3.5 hrs.

8.2 g of purified benzyl ester having the Following characteristics was obtained:

Sulphur content 6.8%
Esterification degree 23.3%

The benzethonium salt of the ester was prepared and the operation proceeded as per Example 10 to give 3 g of purified low-molecular-weight supersulphated chondroitin having the following characteristics:

Average molecular weight 8500 dalton
Uronic acids content 24.2%
Organic sulphur content 7.7%
Specific rotation −20.9°
UV absorption (E at 230 nm) 18
Antithrombin activity (via HC II) $IC_{50}$ 15.3 µg/ml.

EXAMPLE 22

Supersulphated chondroitin benzethonium salt (25 g) obtained from chondroitin isolated from swine intestinal mucosa, having the characteristics described above and, in particular, sulphated as per Example 19, with a sulphur content of 10.6%, was depolymerized as pep Example 11 except that benzyl chloride (5 ml) was used and the reaction time was 3.5 hrs.

7.55 g of purified benzyl ester having the following characteristics was obtained:

Sulphur content 10.75%
Esterification degree 19.6%

The benzethonium salt of said product was prepared and the operation proceeded as per Example 11.

2.95 g of purified low-molecular-weight supersulphated chondroitin having the following characteristics was obtained:

Average molecular weight 8600 dalton
Uronic acids content 30.7%
Organic sulphur content
Specific rotation −13.9°
UV absorption (E at 230 nm) 6.0
Antithrombin activity (via HC II) $IC_{50}$ 0.11 µg/ml.

EXAMPLE 23

Supersulphated chondroitin benzethonium salt (25 g) obtained from chondroitin isolated from bovine trachea, having the characteristics described above and, in particular, a sulphur content of 10.6%, was depolymerized as per Example 22 except that methyl iodide (5 ml) was used instead of benzyl chloride. 7.5 g of methyl ester having the following characteristics was obtained:

Sulphur content 10.95%
Esterification degree 48.6%

The operation proceeded as per Example 22 to give 3.2 g of purified low-molecular-weight supersulphated chondroitin having the following characteristics:

Average molecular weight 7000 dalton
Uronic acids content 30.1%
Organic sulphur content 10.2%
Specific rotation −10.25°
UV absorption (E at 230 nm) 14.35
Antithrombin activity (via HC II) $IC_{50}$ 0.13 µg/ml.

EXAMPLE 24

Benzethonium salt of a glycosaminoglycans (GAGS) mixture (50 g) obtained from GAGS isolated from bovine intestinal mucosa, having the characteristics described hereinbefore and the following composition:

Heparan sulphate like fraction: 50%

Dermatan sulphate fraction: 50% was dissolved in dimethylformamide (250 ml), added with benzyl chloride (7.5 ml), allowed to stand at 25°±1° C. for a period of 2 hrs, and added with Triton B (10 ml). The solution was allowed to stand at 25°±1° C. for a period of 2 hrs, then poured in methanol (500 ml) containing 10% sodium acetate. The precipitate that formed was separated by filtration, washed with methanol, and dried under vacuum at 35° C. to 40° C.

18 g of raw low-molecular-weight GAGS mixture was obtained.

The product obtained was treated with 0.5 N sodium hydroxide (400 ml) at 4° C. for a period of 2 hrs. The solution was neutralized by addition of 1N hydrochloric acid, added with hydrogen peroxide at 110 vol. (1.6 ml), allowed to stand at 4° C. for a period of 4 hrs, heated to room temperature, added with 10% w/v sodium chloride, and precipitated with methanol (800 ml). The precipitate that formed was separated, washed and dried in an oven at 40° C. to 45° C.

18 g of a product was obtained and purified to give 13 g of pure low-molecular-weight product having the following characteristics:

Average molecular weight 7300 dalton
Uronic acids content 30.3%
Organic sulphur content 8.6%
Specific rotation −2.2°
UV absorption (E at 230 nm) 13.4
Antithrombin activity in plasma ($IC_{50}$) 8.8 µg/ml
Anti-Xa factor activity 34 UaXa/mg

EXAMPLE 25

Benzethonium salt of a glycosaminoglycans (GAGS) mixture (50 g) obtained from GAGS isolated from bovine aorta, having the following composition:

Slow moving heparin fraction: 7%
Heparan sulphate like fraction: 52%
Dermatan sulphate fraction: 35%
Chondroitin sulphate: 6% was treated as pep Example 24 except that benzyl chloride (5 ml) was used and the reaction time was 4 hrs.

20 g of a product was obtained and purified with 5% sodium carbonate at 25° C. for a period of 4 hrs to give 15 g of pure low-molecular-weight product having the following characteristics:

Average molecular weight 7700 dalton
Uronic acids content 29.5%

Organic sulphur content 8.75%

Specific rotation +14.9°

UV absorption (E at 230 nm) 7.25

Antithrombin activity in plasma ($IC_{50}$) 10 μg/ml

Anti-Xa factor activity 23 UaXa/mg

Biological activity

The oligosaccharides of the present invention show a biological activity in vitro similar to that of the starting products. Preliminary pharmacological studies carried out on animals indicated that oligosaccharides administered by extravascular route provide an exceptional bioavailability and a higher activity in terms of biological power.

Said studies proved that the oligosaccharides of this invention may be successfully used to prepare pharmaceutical compositions useful for the prophylaxis and treatment of arterial and venous thrombotic states.

The results obtained from tests of bioavailability in the rabbit and antithrombotic activity in the rat are reported below. The products used and the conditions adopted for said tests are the following:

Low-molecular-weight dermatan prepared as per Example 1 (DS1)

Low-molecular-weight dermatan prepared as per Example 2 (DS2)

Starting dermatan (DS)

Doses: 20 and 60 mg/kg in the rabbit 10 and 30 mg/kg in the rat

Administration route in the rabbit: subcutaneous

Administration route in the rat: subcutaneous, 40', 60', and 90' before inducing the stasis.

Evaluation of dermatan blood levels in the rabbit:

Thrombin time test (TT)

Thrombin inhibition test via HC II (Stachrom DS—stago France)

Evaluation of the antithrombotic activity in the rat: Combined model of venous stasis and thrombogenic stimulus. Withdrawal of the thrombus formed, 15' after stasis start.

TABLE 1

Blood levels in the Rabbit (No. 7–8) measured by TT and Stachrom DS (Dose: 60 mg/kg)

| | TT sec | | | | | Stachrom DS μg/ml | | | | |
|---|---|---|---|---|---|---|---|---|---|---|
| min | 30 | 60 | 120 | 300 | 480 | 30 | 60 | 120 | 300 | 480 |
| DS | 97.4 ± 35.6 | 56.3 ± 7.2 | 44.9 ± 3.7 | 34.7 ± 1.6 | 35.6 ± 1.6 | 6.7 ± 1.1 | 5.5 ± 0.9 | 4.3 ± 0.5 | 3.0 ± 0.3 | 3.2 ± 0.5 |
| DS1 | 275.7 ± 24.4 | 207.9 ± 39.8 | 191.6 ± 41.2 | 59.2 ± 7.0 | 41.0 ± 1.9 | 18.4 ± 2.5 | 17.4 ± 2.1 | 12.4 ± 1.9 | 6.3 ± 1.3 | 0.8 |
| DS2 | 195.7 ± 40.7 | 182.2 ± 42.1 | 207.9 ± 44 | 47.0 ± 2.6 | 36.6 ± 1.9 | | | n.d. | | |

TABLE 2

Antithrombotic activity in the rat (No. 10) (Dose 30 mg)

| | Thrombus weight mg | | | Thrombosis inhibition % | | |
|---|---|---|---|---|---|---|
| DS | 6.85 ± 0.82 | 5.39 ± 0.40 | 5.74 ± 0.66 | 17.3 | 34.9* | 30.7 |
| DS1 | 3.17 ± 0.46 | 4.04 ± 0.56 | 4.84 ± 0.28 | 61.7** | 51.2** | 41.5* |

TABLE 2-continued

Antithrombotic activity in the rat (No. 10) (Dose 30 mg)

| | Thrombus weight mg | | | Thrombosis inhibition % | | |
|---|---|---|---|---|---|---|
| DS2 | 4.16 ± 0.41 | 4.60 ± 0.52 | 6.31± 0.98 | 49.8* | 44.3* | 26.0 |
| Controls 8.28 ± 0.46 | | | | | | |

*p <0.05
**p <0.01

I claim:

1. Oligosaccharides showing biological activity derived from supersulphated dermatan,. with a heparin content less than 1% by weight having the following characteristics:

average molecular weight, determined by the method of Size Exclusion Chromatography HPLC, between 2,500 and 15,000 dalton, at least 50% by weight of said oligosaccharides having a molecular weight in the ±20% range with respect to the average molecular weight;

specific UV absorption at 230 nm between 6 and 30;

specific rotation power at 20° C. between −70° to +30°;

uronic acids content between 23% to 35% by weight;

sulfate groups content between 6% to 12%;

anti-Xa factor activity between 5 and 50 UaXa/mg;

antithrombin activity equal to or higher than that of said supersulfated dermatan; and blood level in the rabbit expressed as thrombin time test (TT) at 30 minutes of from 195.7 to 275.7 for a dose of 60 mg/kg.

2. The oligosaccharides according to claim 1 wherein more than 80% by weight of said oligosaccharides have a molecular weight in the ±20% range with respect of the average molecular weight.

3. Process for the preparation of the oligosaccharides having the characteristics described in claim 1 comprising the following steps: a) the supersulphated dermatan with a heparin content less than 1% by weight is salified in an aqueous solvent with a quaternary ammonium base, at a temperature of 10° C. to 40° C. to obtain a relevant salt; b) the resulting salt is esterified in an organic solvent at a temperature of 20° C. to 55° C. and with reaction times between 1 to 48 hours to give an esterified carboxylic group content of 5% to 70% by weight with respect to carboxylic groups present in the starting supersulphated dermatan; and c) the resulting ester is directly depolymerized in the same organic solution in presence of a base, at a temperature of 0° C. to 35° C., for a period of 1 to 48 hours with liberation of the oligosaccharide formed, which is collected and purified by alcoholic precipitation, decolourizing treatment with peroxides, ultrafiltration and reverse osmosis.

4. The process according to claim 1, wherein the esterified product obtained in b) is purified before treatment with the base of step c).

5. The process according to claim 1, wherein the quaternary ammonium base for step a) is selected from benzethonium chloride, cetylpyridinium chloride and quaternary ammonium bases whose molecule contains at least 15 carbon atoms.

6. The process according to claim 1, wherein the esterifying agents for step b) are selected from methyl, ethyl and benzyl chlorides, bromides and iodides.

7. The process according to claim 1, wherein the base for step c) is selected from sodium hydroxide, potassium hydroxide, sodium or potassium alcoholates or methylates, alkaline metal carbonates, and benzyltrimethylammonium hydroxide.

8. The process according to claim 1, wherein the organic solvents used in steps b) and c) are selected from dimethylformamide, formamide, methylene chloride and dimethyl sulfoxide.

9. Pharmaceutical compositions useful for the prophylaxis and treatment of arterial and venous thrombotic states containing effective amounts of oligosaccharides according to claim 1 and appropriate pharmaceutically acceptable vehicles or adjuvants.

10. Pharmaceutical compositions useful for the prophylaxis and treatment of arterial and venous thrombotic states containing effective amounts of oligosaccharides obtained according to claim 3 and appropriate pharmaceutically acceptable vehicles or adjuvants.

11. The oligosaccharides according to claim 1, wherein the starting supersulphated dermatan has a heparin content of <1%, organic sulphur content of 7.5% to 12%, specific rotation power of −25° to −65°, uronic acids content of 23% to 37%, average molecular weight, determined by the method of Size Exclusion Chromatography HPLC, of 16,000 to 40,000 dalton, and antithrombin activity via Heparin Cofactor II $IC_{50}$ of 0.01 to 0.5 µg/ml.

* * * * *